(12) United States Patent
Roark et al.

(10) Patent No.: US 7,391,313 B2
(45) Date of Patent: Jun. 24, 2008

(54) EMERGENCY POWER SHUTDOWN MANAGEMENT SYSTEM

(75) Inventors: Christopher Dean Roark, Vacaville, CA (US); James B. Zaboski, Danville, CA (US)

(73) Assignee: Fike Corporation, Blue Springs, MO (US)

( * ) Notice: Subject to any disclaimer, the term of this patent is extended or adjusted under 35 U.S.C. 154(b) by 201 days.

(21) Appl. No.: 11/257,283

(22) Filed: Oct. 24, 2005

(65) Prior Publication Data
US 2007/0090940 A1   Apr. 26, 2007

(51) Int. Cl.
*G08B 29/00* (2006.01)

(52) U.S. Cl. ............... 340/506; 340/3.1; 340/825.36; 340/825.49

(58) Field of Classification Search ............. 340/506, 340/3.1, 825.36, 825.49
See application file for complete search history.

(56) References Cited

U.S. PATENT DOCUMENTS 6,806,446 B1 * 10/2004 Neale .................. 219/497

OTHER PUBLICATIONS

E-mail from Jim Zaboski to Tom Luebbering (Aug. 31, 2005, 12:14 PM CST) and attached project list.

* cited by examiner

*Primary Examiner*—Daryl C Pope
(74) *Attorney, Agent, or Firm*—Hovey Williams LLP

(57) ABSTRACT

An emergency power shutdown management system (EPSMS) comprises a programmable logic controller (PLC), relays coupled to the outputs of the PLC for shutting down electrically operated equipment, and indicators for indicating the status of the EPSMS and the controlled equipment. The PLC receives input signals from a fire control panel including a $2^{nd}$ alarm signal which is generated after the fire control panel has detected smoke, fire or an explosion with two or more detectors and a system discharge signal which is generated when the fire control panel triggers fire sprinklers or the release of other fire or explosion suppression agents. The PLC also receives an emergency power off (EPO) signal from an EPO switch which is activated to immediately shut down all electrically operated equipment and power distribution units in a protected area. The indicators include a $2^{nd}$ alarm indicator for indicating a $2^{nd}$ alarm activation; a system discharge indicator for indicating a discharge of fire or explosion suppression agents; and an emergency power off indicator for indicating an emergency power off situation. The relays include $2^{nd}$ alarm equipment relays coupled with a first set of equipment; system discharge relays coupled with a second set of equipment; and shunt trip relays coupled with a third set of equipment. All of the components of the EPSMS are housed within a single cabinet for consolidating the control and alert functions of the EPSMS in a single location.

12 Claims, 3 Drawing Sheets

EMERGENCY POWER SHUTDOWN MANAGEMENT SYSTEM

BACKGROUND OF THE INVENTION

1. Field of the Invention

The present invention relates to an emergency power shutdown management system. More particularly, the invention relates to such a system that consolidates, controls, and monitors the power off circuits for a room or other zone protected by a fire or explosion protection system.

2. Description of the Prior Art

Many buildings, factories, and other facilities include rooms or other zones protected by fire and/or explosion suppression equipment. Before and during operation of such suppression equipment, it is necessary to control and shut down certain electrically operated equipment. For example, before discharge of a fire or explosion suppression agent into a room, it is desirable to first shut down air handling units, exhaust fans, etc. to prevent interference with the dispersion of the suppression agent. It is also necessary to shut off all power and power distribution units to protect firefighters and other persons who may be in the room.

Emergency power-off controls are often provided for these purposes. Unfortunately most emergency power off controls are afterthoughts. They are designed, installed, and tested in the field at the end of a project in order to meet code minimum requirements and get the job signed off. Consequently, most jobs end up with a "decentralized" emergency power off system usually comprised of relays located in j-boxes scattered about the room, sub floor, and/or above ceilings; and unidentified and unmonitored circuit breakers that feed power to shunt-trip breakers and relays. Moreover, these systems are typically undocumented—no wiring diagrams, location of devices, and intended sequence of operation. Additionally, there are typically no easy ways to defeat these systems during routine maintenance. Emergency power off controls installed in this fashion are also subject to some troubling ongoing operational issues. For example, such systems can be unreliable in that wires can be disconnected or shunt-trip power circuits turned off rendering the controls useless with no trouble alarm or notification to users. Similarly, since there are no simple ways to disable these controls, accidental activation and thus accidental equipment shutdown can and does occur. Due to lack of documentation, changes or troubleshooting is cumbersome and costly.

There is therefore a need for an improved emergency power shutdown management system that overcomes the limitations of the prior art. More particularly, there is a need for a system that more effectively consolidates, controls, and monitors the power off circuits for a room or zone protected by a fire or explosion protection system.

SUMMARY OF THE INVENTION

The present invention solves the above-described problems and provides a distinct advance in the art of emergency power shutdown management systems. More particularly, the present invention provides a system that more effectively consolidates, controls, and monitors the power off circuits for a room or other zone.

The present invention solves the above-referenced operational problems by providing an emergency power shutdown management system (EPSMS) whose controls are consolidated in a single cabinet and that is manufactured and tested off site. The system is programmed to receive input signals from a fire control panel and/or other input signal sources and to shut down specified electrically-operated equipment in a manner that best assists the suppression of a fire or explosion and protects people and assets in the protected area. The system includes superior monitoring capabilities with local visual and audible annunciation and internal relays which can be remotely monitored.

One embodiment of the EPSMS comprises a programmable logic controller (PLC), a plurality of relays coupled to the outputs of the PLC for shutting down certain electrically operated equipment, and a plurality of indicators for indicating the status of the EPSMS and the controlled equipment. The PLC receives input signals from a fire control panel including a $2^{nd}$ alarm signal which is generated after the fire control panel has detected smoke, fire or an explosion with two or more detectors and a system discharge signal which is generated when the fire control panel triggers fire sprinklers or the release of other fire or explosion suppression agents. The PLC may also receive an emergency power off (EPO) signal from an EPO switch which may be activated to immediately shut down all electrically operated equipment and power distribution units in a protected area.

The indicators preferably include a $2^{nd}$ alarm indicator for indicating a $2^{nd}$ alarm activation; a system discharge indicator for indicating a discharge of fire or explosion suppression agents; and an emergency power off indicator for indicating an emergency power off situation. The relays preferably include a plurality of $2^{nd}$ alarm equipment relays coupled with a first set of equipment; a plurality of system discharge relays coupled with a second set of equipment; and a plurality of shunt trip relays coupled with a third set of equipment. Importantly, all of the components of the EPSMS are housed within a single cabinet for consolidating the control and alert functions of the EPSMS in a single location.

In operation, the PLC activates the $2^{nd}$ alarm indicator and the $2^{nd}$ alarm equipment relays upon receipt of a $2^{nd}$ alarm signal from the fire control panel. The $2^{nd}$ alarm relays then shut down the first set of equipment. The PLC activates the system discharge indicator and the system discharge relays upon receipt of a system discharge signal from the fire control panel. The system discharge relays then shut down the second set of equipment. The PLC activates the emergency power off indicator, the $2^{nd}$ alarm equipment relays, the system discharge relays, and the shunt trip relays upon receipt of an emergency power off signal from an emergency power off switch. The relays then shut down the first, second, and third sets of equipment.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
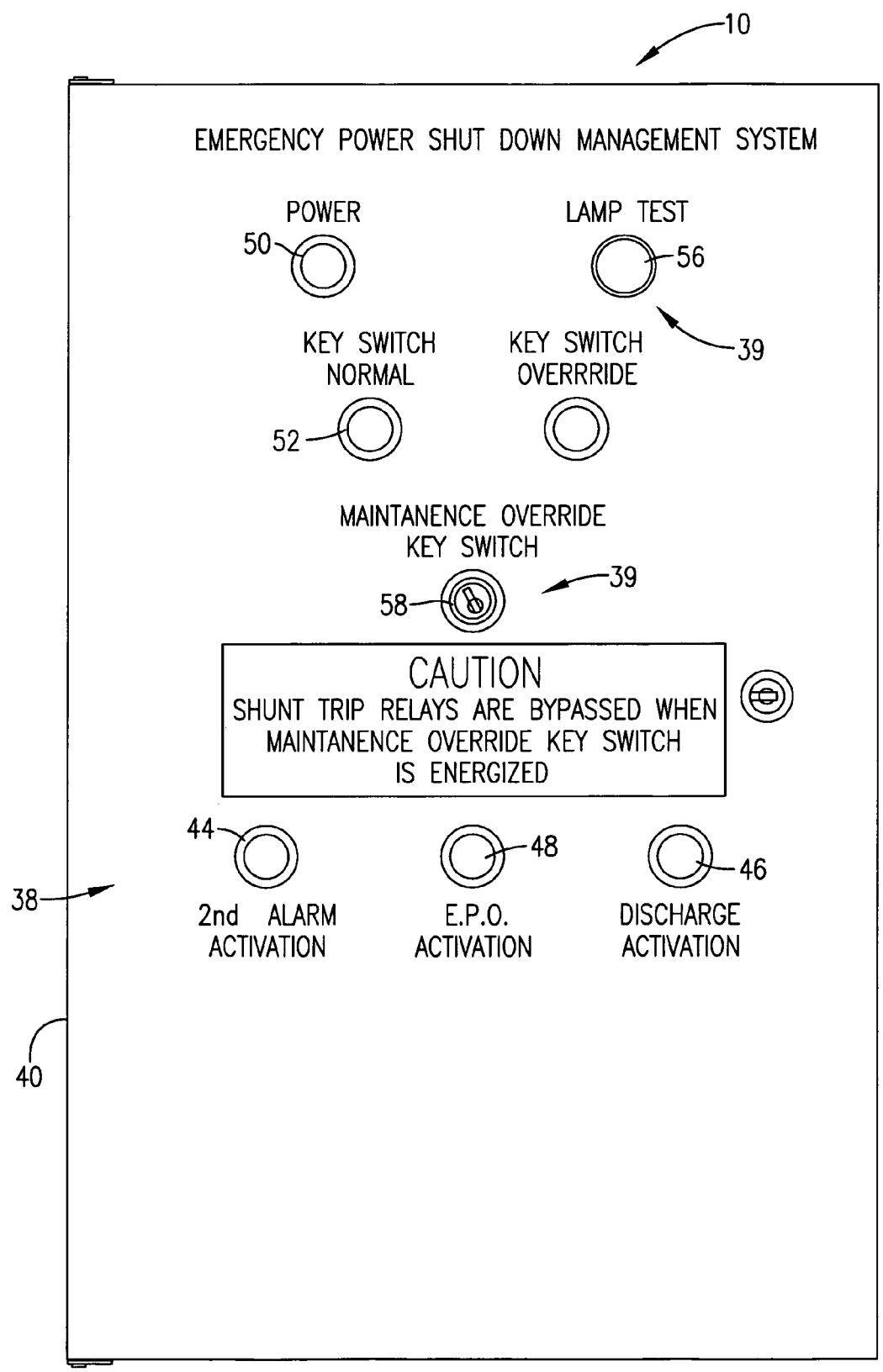
FIG. 1 is an elevational view of an emergency power shutdown management system constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 3:
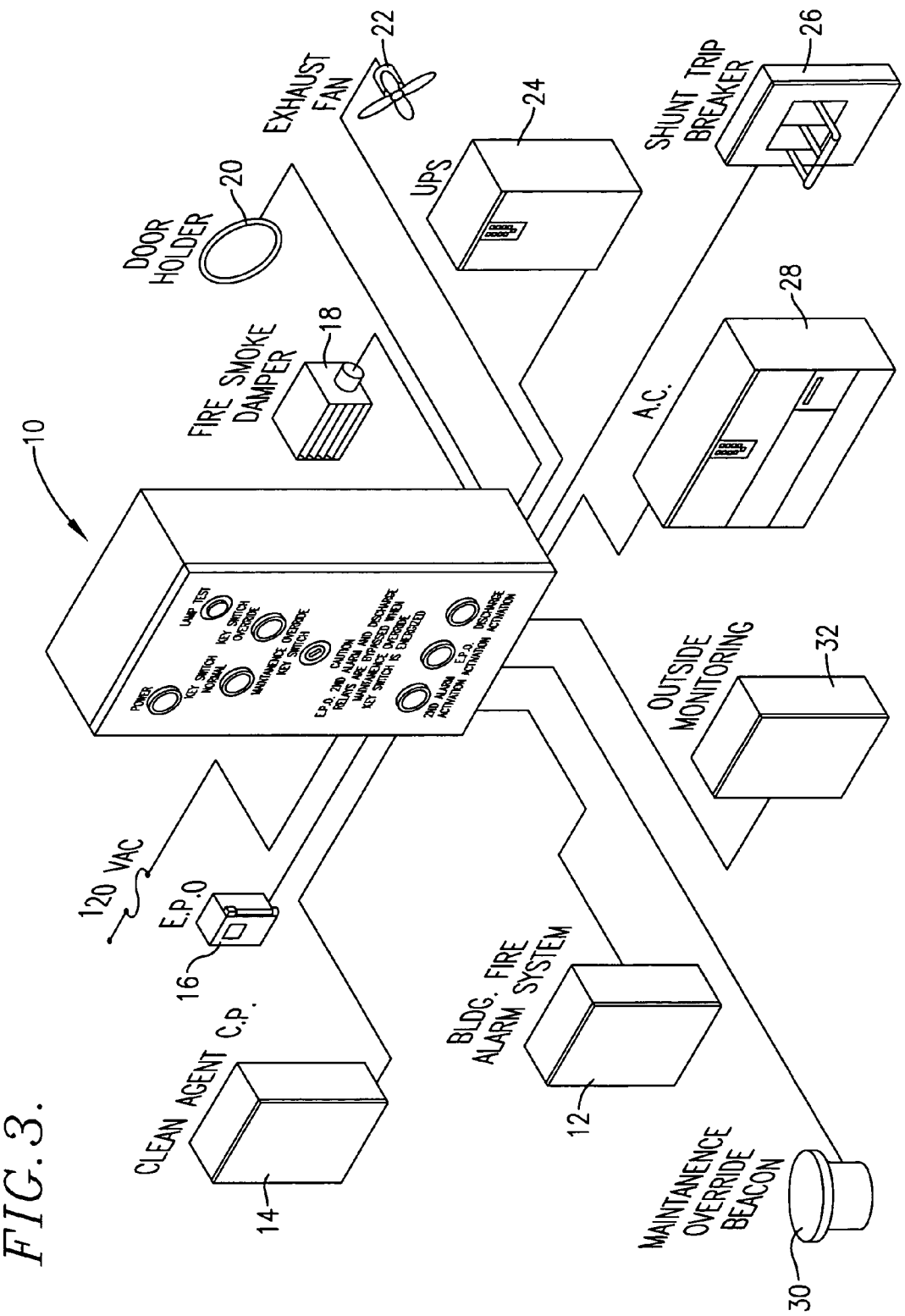
FIG. 3 is a schematic diagram of the emergency power shutdown management system of FIG. 1 shown operatively coupled with various input signal sources and controlled devices.

An EPSMS 10 constructed in accordance with a preferred embodiment of the present invention is shown in the drawing figures. As illustrated in FIG. 3, the EPSMS 10 maybe coupled with various input signal sources, controlled devices, and monitoring devices for consolidating, controlling, and monitoring the shut-down of the controlled devices. For example, the EPSMS may receive input signals from a fire control panel 12, a clean agent control panel 14, and an emergency power off (EPO) switch or button 16. The controlled devices may include a fire/smoke damper 18, one or more electrically operated door holders 20, an exhaust fan 22, an uninterruptible power supply (UPS) 24, equipment connected to one or more shunt trip breakers 26, and an air conditioning unit 28. The monitoring devices may include a maintenance override beacon 30 and one or more remote or outside monitoring stations 32. These are just some of the examples of the devices which can be coupled with the EPSMS, as the present invention can be used with other input signal sources, controlled devices, and monitoring devices without departing from the scope of the claims.

The fire control panel 12 monitors fire or explosion detection equipment such as smoke detectors in a room or zone and provides a $2^{nd}$ alarm signal to the EPSMS 10 upon detection of smoke, fire or an explosion by at least two of the detectors. The fire control panel 12 also starts a time delay countdown, such as a 30 second countdown, after receiving signals from two or more detectors and then triggers sprinklers, rupture discs or other devices to release fire or explosion suppression agents into the room or zone after the time delay countdown. At the same time, the fire control panel 12 provides a system discharge signal to the EPSMS 10.

The emergency power off (EPO) switch 16 may be activated to immediately disconnect power to all electrically operated equipment in the room or zone and to shut down or disconnect all power delivery equipment for the room or zone. The EPO switch 16 also provides an EPO signal to the EPSMS 10 when activated. The EPO switch is preferably a dual action keyed latching type switch. The switch may be labeled as follows:

Emergency Power Shutdown
  This EPO switch is connected to an Emergency Power Shutdown Management System (EPSMS) and can be overridden for maintenance purposes.

Figure 2:
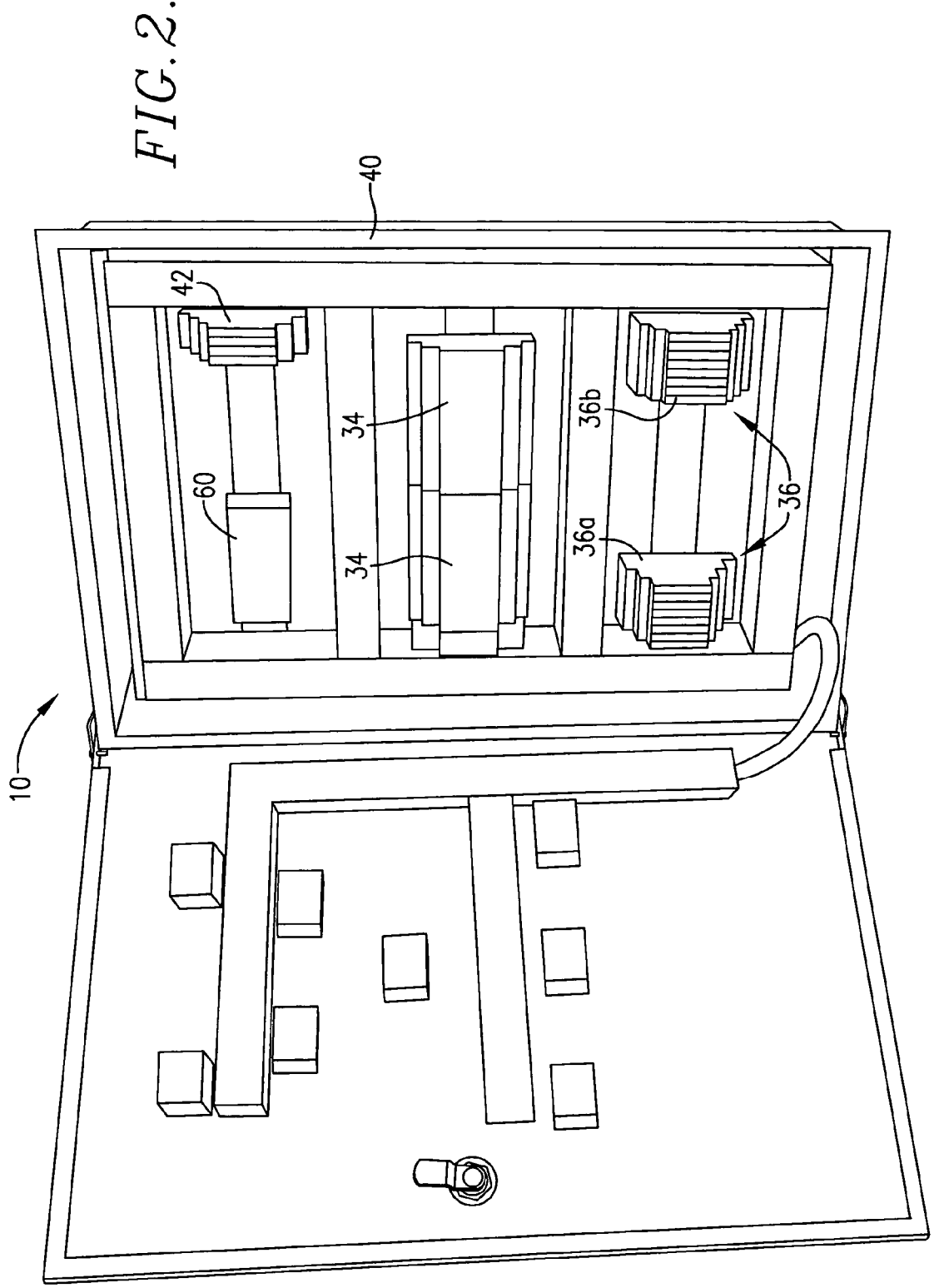
FIG. 2 is an elevational view of the emergency power shutdown management system of FIG. 1 with its front door opened to show internal components.

As best illustrated in FIGS. 1 and 2, the EPSMS 10 includes one or more programmable logic controllers (PLCs) 34 or other computing devices for receiving the input signals from the fire control panel 12, EPO switch 16 or any other input signal sources; a plurality of relays 36 coupled between the outputs of the PLC and the controlled equipment for shutting down the controlled equipment; a plurality of visual and/or audible indicators 38 for indicating the status of the EPSMS 10 and the controlled equipment; and one or more control buttons or switches 39 for controlling certain functions of the EPSMS 10. These components are all conveniently housed within a single enclosure 40 for consolidating the shutdown of the controlled equipment.

The programmable logic controllers (PLCs) 34 maybe Cutler-Hammer Eaton EZ intelligent relay EZ 719-AC-RCX devices or any equivalent device. The PLCs may also be replaced with other computing or logic devices.

The relays 36 may be any conventional relays such as N.O. and N.C. Cutler-Hammer C383RLDG intelligent process interface single type poles rated at 6 AMP 120 V AC. The relays 36 preferably include $2^{nd}$ alarm equipment relays 36a for shutting down a first set of controlled equipment and system discharge relays 36b for shutting down a second set of controlled equipment. The first set of equipment may include the fire smoke dampers 18, magnetic door holders 20, exhaust fans 22, and the AC or other HVAC equipment 28. The second set of equipment may include the uninterruptible power supply units 24, power distribution units, and other power protection devices.

The EPSMS 10 also preferably includes one or more shunt trip relays 42 for shutting down a third set of controlled equipment connected to associated shunt trip circuit breakers. The third set of controlled equipment may include some or all of the second set of equipment and/or other equipment which could cause electrical shock or electrocution to a person.

The visual indicators 38 are preferably LEDs such as Cutler-Hammer E22H, full voltage, flush type LEDs rated at 120 VAC. However, other types of visual indicators may be used without departing from the scope of the present invention. As best illustrated in FIG. 1, the visual indicators 38 preferably include a $2^{nd}$ alarm indicator 44 for indicating the $2^{nd}$ alarm activation; a system discharge indicator 46 for indicating the discharge of fire or explosion suppression agents; and an EPO indicator 48 for indicating an emergency power off situation. The EPSMS 10 may also include a power-on indicator 50 and two key switch indicators 52, 54.

The control buttons or switches 39 preferably include a lamp test button 56 and a maintenance override key switch 58. The lamp test button 56 may be any depressible or moveable button or switch such as a momentary red test switch Cutler-Hammer E22P2A. The keyed override switch 58 disables the EPSMS 10, preventing it from shutting any equipment down regardless of any input signals the EPSMS receives. The maintenance override key switch 58 can be any switch such as a two position Cutler-Hammer E33K53.

The visual indicators 38 also include the notification beacon 30 for alerting nearby persons when the EPSMS 10 is switched to the maintenance mode. The beacon 30 is preferably located a minimum of three feet above the EPSMS panel 10 and is be powered from the EPSMS control panel. The beacon 30 is activated when the maintenance override key switch is in the override (maintenance) position.

The enclosure 40 is preferably a NEMA-1 rated enclosure capable of being surface or flush mounted with a swing door and key lock. The enclosure may be constructed of any suitable material such as 18-gauge or greater steel and may be powder coated red inside and out. All components of the EPSMS 10 are preferably furnished in one enclosure.

The EPSMS 10 is connected to a suitable source of power such as a 120 VAC electricity source. Input power to the enclosure is protected by a breaker or fuse such as an internally mounted Cutler-Hammer 120 VAC 10-amp circuit breaker.

The PLCs 34, relays 30, indicators 38, and buttons and switches 39 are interconnected by wiring such as 16 gauge THHN stranded color black wiring. All wire is routed in PANDUIT base duct slotted wall Panduit FIX2LG6 and covered with Panduit C1LG6. The EPSMS 10 may also include appropriate terminal blocks such as Cutler-Hammer screw type single level terminal blocks numbered with Cutler-Hammer identification labels.

All labels on the exterior of the enclosure 40 are preferably black plastic with white engraved letters, a minimum of ½" high. All labels inside the enclosure are preferably P-Touch style. All relays and LEDs are labeled for their function. All labels coordinate with a wiring schematic and wiring diagram, a copy of which and sequence of operation is furnished and installed inside the enclosure.

OPERATION

The EPSMS 10 may be installed and operated in any room, zone or other area which is protected by a fire or explosion control system. The EPSMS 10 is preferably assembled and bench tested to verify proper operation prior to delivery to the job site. In normal operation, the power-on LED 50 is illuminated, the keyed switch 58 is in the normal position, and the key switch normal LED 52 is illuminated. All other indicators are turned off.

When the fire control panel 12 detects fire, smoke, or an explosion with at least two detectors, it generates a $2^{nd}$ alarm signal and sends it to an input of the PLC 34. The PLC 34 activates the $2^{nd}$ alarm indicator 44 and the $2^{nd}$ alarm equipment relays 36a upon receipt of the $2^{nd}$ alarm signal. The relays 36a then shut down the first set of equipment described above to prepare the protected room or zone for the imminent dispersion of fire or explosion suppression agents into the room or zone.

After the fire control panel 12 has completed the time delay countdown described above, it generates a system discharge signal and sends it to an input of the PLC 34. The PLC activates the system discharge indicator 46 and the system discharge relays 36b upon receipt of the system discharge signal. The relays 36b then shut down the second set of equipment described above to prevent equipment damage and shock hazards due to release of the suppression agents.

Whenever a person activates the EPO switch, an EPO signal is sent to an input of the PLC 34. The EPO switch may be activated by a person, for example, when another person accidentally contacts a short circuit or other electrical hazard and is in danger of being electrocuted. Upon receipt of the EPO signal, the PLC activates the emergency power off indicator 48, the $2^{nd}$ alarm equipment relays 36a, the system discharge relays 36b, and the shunt trip relays 42. The relays 36a, 36b, and 42 then shut down the first, second, and third sets of equipment. The shunt trip relays 42 are preferably only activated for five seconds to prevent electrical damage to the coils of the associated shunt trip breakers.

When the maintenance override key switch 58 is placed in the override position, the key switch override lamp 54 is illuminated and the key switch normal lamp 52 is extinguished. The second alarm and discharge shutdown relays 36a, 36b remain in normal position and cannot be energized regardless of any input signal received by the PLC 34. When the EPSMS 10 is in override, if any input signal is received, the appropriate second alarm LED 44, discharge LED 46 and/or EPO LED 48 is illuminated, but no equipment is shut down.

The EPSMS 10 also preferably includes a system trouble relay 60 which is activated when the maintenance override switch 58 is in the override position to send an appropriate warning signal to the outside or remote monitoring station 32. The maintenance notification beacon 30 is also illuminated. The system trouble relay is also activated if the EPSMS is disconnected from power.

When the lamp test button 56 is pressed, all lamps on the front of the EPSMS control panel illuminate for testing purposes. The lamps return to their normal condition when the lamp test button is released.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A power shut-down management system for consolidating, controlling, and monitoring the shut-down of electrically powered equipment, the system comprising:
    a $2^{nd}$ alarm indicator for indicating a $2^{nd}$ alarm activation;
    a system discharge indicator for indicating a discharge of fire or explosion suppression agents;
    an emergency power off indicator for indicating an emergency power off situation;
    a plurality of $2^{nd}$ alarm equipment relays coupled with a first set of equipment;
    a plurality of system discharge relays coupled with a second set of equipment;
    a plurality of shunt trip relays coupled with a third set of equipment;
    a programmable logic controller programmed to
        activate the $2^{nd}$ alarm indicator and the $2^{nd}$ alarm equipment relays upon receipt of a $2^{nd}$ alarm signal from a fire control panel to indicate the $2^{nd}$ alarm activation and to shut down the first set of equipment;
        activate the system discharge indicator and the system discharge relays upon receipt of a system discharge signal from the fire control panel to indicate the discharge of fire or explosion suppression agents and to shut down the second set of equipment;
        activate the emergency power off indicator, the $2^{nd}$ alarm equipment relays, the system discharge relays, and the shunt trip relays upon receipt of an emergency power off signal from an emergency power off switch to indicate the emergency power off situation and to shut down the first, second, and third sets of equipment; and
    a cabinet for housing the $2^{nd}$ alarm indicator, the system discharge indicator, the emergency power off indicator, the $2^{nd}$ alarm equipment relays, the system discharge relays, the shunt trip relays, and the programmable logic controller.

2. The system as set forth in claim 1, further including an audible alert for audibly indicating the emergency power off situation.

3. The system as set forth in claim 2, wherein the programmable logic controller is further programmed to activate the audible alert upon receipt of the emergency power off signal.

4. The system as set forth in claim 1, the first set of equipment being selected from the group consisting of air handling units, fire smoke dampers, exhaust fans, and magnetic door holders.

5. The system as set forth in claim 1, the second set of equipment being selected from the group consisting of uninterruptible power supply units, power distribution units, and other power protection devices.

6. The system as set forth in claim 1, the third set of equipment being selected from the group consisting of power supply units and electrically operated devices.

7. The system as set forth in claim 1, further including a maintenance override key switch having a normal position and a maintenance position, a key switch normal indicator, a key switch override indicator, a pair of trouble relays, and a notification beacon.

8. The system as set forth in claim 7, wherein the programmable logic controller is further programmed to activate the key switch normal indicator and to energize the trouble relays when the maintenance override key switch is switched to the normal position.

9. The system as set forth in claim 7, wherein the programmable logic controller is further programmed to activate the key switch override indicator, activate the notification beacon, and de-energize the trouble relays when the maintenance override key switch is switched to the maintenance position.

10. The system as set forth in claim 7, the programmable logic controller being further programmed to
- activate the $2^{nd}$ alarm indicator without energizing the $2^{nd}$ alarm equipment relays when the maintenance override key switch is switched to the maintenance position and upon receipt of the $2^{nd}$ alarm signal;
- activate the system discharge indicator without energizing the system discharge relays when the maintenance override key switch is switched to the maintenance position and upon receipt of the system discharge signal;
- activate the emergency power off indicator without energizing the shunt trip relays when the maintenance override key switch is switched to the maintenance position and upon receipt of the emergency power off signal.

11. The system as set forth in claim 1, further including a depressible lamp test button and a notification beacon.

12. The system as set forth in claim 11, wherein the programmable logic controller is further programmed to activate the $2^{nd}$ alarm indicator, the system discharge indicator, the emergency power off indicator, an audible alert, the notification beacon, and a key switch override indicator when the depressible lamp test button is depressed.

* * * * *